INVENTORS,
WILLIAM T. MACAULEY
FRANK MARTINEK
ATTORNEYS

United States Patent Office 3,557,554
Patented Jan. 26, 1971

3,557,554
POWER CONVERSION SYSTEM OPERATING ON CLOSED RANKINE CYCLE
Frank Martinek, Burlington, Vt., and William T. Macauley, Arcadia, Calif., assignors to Aerojet-General Corporation, El Monte, Calif., a corporation of Ohio
Filed May 22, 1968, Ser. No. 731,208
Int. Cl. F01n 3/04
U.S. Cl. 60—94                                      10 Claims

ABSTRACT OF THE DISCLOSURE

This disclosure concerns a power conversion system for converting heat energy to electrical power, wherein the power conversion system includes a so-called jet condenser connected to the exhaust outlet of a turbine which drives an electric generator, such as an alternator, in producing electrical power. The power conversion system comprises a closed Rankine cycle employing an organic working fluid. The single working fluid after being heated to its vaporized phase drives the turbine to generate electrical power and is discharged from the exhaust outlet of the turbine in its vapor phase for admission into the condenser. A jet stream of cooled working fluid in its liquid phase is injected into the jet condenser to mix with the vaporized working fluid coming from the exhaust outlet of the turbine. The mixing of the cooled liquid working fluid with the vaporized working fluid causes rapid condensation of the vaporized working fluid for reuse in the system cycle, while providing for a reduction in the turbine back pressures which are critical to the efficiency of the system so as to improve its efficiency in producing an electrical output from a suitable heat source. The heat source employed with the system may comprise nuclear energy, such as heat energy from nuclear reactors or radioactive isotopes, or chemical heating, solar energy, or other heat sources which are capable of heating a working fluid in its liquid phase in a boiler prior to admitting the working fluid as a heated vapor into the turbine for driving the turbine blades and producing electrical energy through an alternator operated by the rotating shaft of the turbine.

BACKGROUND OF THE INVENTION

This invention relates to a power conversion system and a method of producing electrical power, wherein heat energy is converted to electrical power in a closed Rankine cycle, preferably using an organic working fluid therein.

In many specialized areas, power system requirements have to a large extent been unsatisfied. Thus, power system needs in space, missiles, aircraft, undersea and special land applications have long been known. The conversion of heat energy into electrical power is recognized as one approach in providing an appropriate power system for such specific applications. The heat source employed could comprise any one of a number of sources, such as nuclear energy from nuclear reactors or radioactive isotopes, chemical heating, solar energy, etc. In a typical Rankine cycle system, the heat source is employed to heat a working fluid (usually water-steam) in its liquid phase in a boiler prior to admitting the working fluid as a heated vapor into a turbine for driving the turbine blades and producing electrical energy through an alternator operated by the rotating shaft of the turbine. The working fluid is then discharged as a superheated vapor from the turbine and directed through a two-phase condenser, wherein the working fluid exists in both its vapor and liquid forms until complete condensation of the vapor portion thereof occurs before the working fluid in its liquid phase is re-cycled to the boiler where it is again heated and vaporized.

In this Rankine cycle system, the vapor head for the condenser is maintained at a low level of magnitude and the liquid head for the re-cycling pump is likewise maintained at a low level of magnitude which resulted in a requirement for a high back pressure on the turbine. Since the turbine back pressure has been required in the Rankine cycle system to be maintained at a high level of magnitude, expansion of the heated vapor through the turbine has been subject to certain limiting factors and the efficiency of the Rankine cycle system in producing electrical power has remained at a comparatively low level. However, this efficiency is improved by increasing the size of the turbine and correspondingly the system such that for producing very large amounts of electrical power in the megawatt range, the Rankine cycle employing steam as a working fluid is presently regarded as being superior economically to all other forms of electrical power-producing systems except hydroelectric systems utilizing the force of falling water in generating electrical power.

The picture changes drastically where the power requirements are in a relatively low range, such as from 3–30 kilowatts. Here, steam is not nearly as attractive as a working fluid in a Rankine cycle power conversion system because of its thermodynamic properties including its very high heat content. A Rankine cycle power conversion system intended to provide electrical power in a relatively low range below the megawatt power range and employing steam as a working fluid would characteristically involve the use of a very small, very high-speed turbine unit with a decided tendency toward high leakage and high parasitic losses. Such a unit would in many instances be regarded as mechanically impractical.

Therefore, because of the relatively high back pressure requirement for the turbine in the typical Rankine cycle power conversion system, the efficiency of such systems designed for producing relatively low amounts of electrical power in the kilowatt range has been adversely affected because it has been difficult to attain a high pressure ratio across the power conversion system. This high pressure ratio is important in considering overall power system efficiency, size, and weight. Commonly, the Rankine cycle power conversion system is also adversely affected in that the working fluid exists in a dual liquid-vapor phase as it is directed through a heat exchanger or heat rejection system which may result in cavitation problems at the inlet end of the re-cycling pump which receives the working fluid discharged from the heat rejection system in the Rankine cycle. The Rankine cycle system is also affected by its environment (such as zero gravity in space applications).

The present invention directs itself to an improved power conversion system utilizing a closed Rankine cycle for converting heat energy to electrical power in a relatively low power range, such as 3–30 kilowatts, wherein a so-called jet condenser comprises a component of the power conversion system and an organic working fluid is employed in place of steam. The jet condenser is connected to the exhaust outlet of the turbine which drives the alternator. In this instance, the utilization of the jet condenser in the closed Rankine cycle power conversion system makes it possible to effect a substantial reduction in the back pressure of the turbine, exhaust, thereby attaining a high pressure ratio across the power conversion system to increase the efficiency of the system in producing electrical power, while also having a beneficial effect on the size and weight required to produce given quantities of electrical power.

SUMMARY OF THE INVENTION

This invention concerns an improved power conversion system and a method of producing electrical power in which heat energy is converted to electrical power. The power conversion system is of the closed Rankine cycle type including a heat source, a turbine, an electrical generator driven by the turbine, a condenser, and a heat rejection apparatus such that a single working fluid upon being heated to a vapor phase by the heat source is directed into the turbine so as to drive the turbine and produce electrical energy, wherein the improvement resides in including a jet condenser as a component in the system with the jet condenser being connected to the exhaust outlet of the turbine and receiving the working fluid in its vapor phase following its discharge from the exhaust outlet of the turbine. The jet condenser is effective to wholly condense the vaporized working fluid into its liquid phase, this condensation of the working fluid being accomplished by injecting a jet stream of cooled working fluid in its liquid phase into the jet condenser adjacent its inlet side, the jet stream of cooled working fluid in its liquid phase having been re-cycled to the jet condenser from the heat rejection apparatus of the improved power conversion system. The cooled working fluid in its liquid phase is thereby mixed with the vaporized working fluid coming from the exhaust outlet of the turbine within the jet condenser which effects rapid condensation of the vaporized working fluid for reuse in the system cycle and also provides for a reduction in the turbine back pressure, thereby improving the efficiency of the power conversion system in producing electrical power from a suitable heat source. The liquid jet stream of re-cycled working fluid is aimed so as to enter the jet condensers for mixing with the vaporized working fluid with minimum wall impingement as the liquid jets enter a convergent-divergent throat section of the jet condenser downstream of the mixing chamber. The liquid jets are thereby accelerated due to the momentum exchange with the vaporized working fluid with a minimum loss in momentum as the vaporized working fluid is expanded in the convergent-divergent throat section. The heat source may comprise nuclear energy, such as heat energy from nuclear reactors or radioactive isotopes, or chemical heating, solar energy, or any other suitable heat source which is capable of heating a working fluid in its liquid phase in a boiler prior to admitting the working fluid as a heated vapor into the turbine for driving the turbine blades to produce electrical energy from an alternator operated by the rotating shaft of the turbine.

More specifically, the present power conversion system preferably employs an organic working fluid, rather than the steam-water working fluid commonly employed in large electrical generating plants utilizing a Rankine cycle system. An organic working fluid has been found to offer certain advantages over water-steam as a working fluid in a Rankine cycle where the power range is below the megawatt level or in a low power range, such as 3–30 kilowatts because of the thermodynamic properties of the organic working fluid as opposed to those of steam. An organic working fluid has a temperature-entropy relationship with an unusual reverse slope which can be capitalized upon to eliminate design problems of turbine erosion resulting from boiler carryover or condensation as vapor is expanded.

Figure 1:
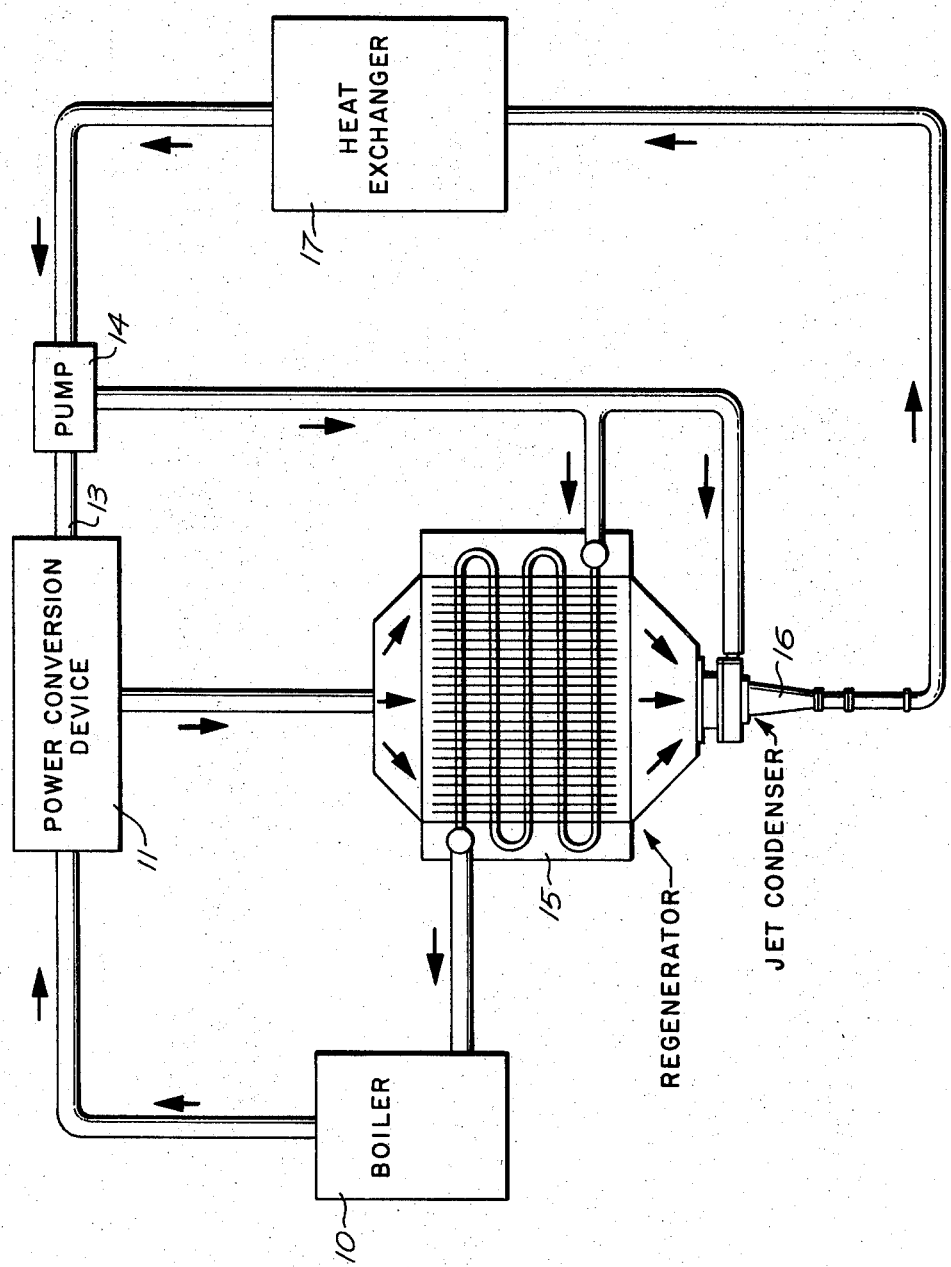
FIG. 1 is a diagrammatic showing of a power conversion system constructed in accordance with the present invention.

Referring more specifically to the invention as best shown in FIG. 1, a power conversion system is illustrated for producing electrical power from heat energy, the power conversion system comprising a closed Rankine cycle and utilizing a single working fluid, preferably an organic working fluid, which in various stages of the Rankine cycle assumes a liquid phase and a vapor phase. "Dowtherm A," commercially available from the Dow Chemical Company of Midland, Mich. and comprising a eutectic mixture of diphenyl oxide and diphenyl, with approximate percentages by weight being 26.5% diphenyl to 73.5% diphenyl oxide, is one organic working fluid which has been found to be a suitable working fluid in the present improved power conversion system. This is a non corrosive, non-toxic organic working fluid whose use in a Rankine cycle system intended to produce electrical power in a relatively low power range (as, for example, 3–30 kilowatts) has been found to offer definite advantages over water-steam as a working fluid. In this connection, the very high heat content of steam when utilized in a Rankine cycle system intended to produce electrical energy in a low power range can be expected to result in a very small, high-speed electrical generating system which tends to be high in leakage, high in parasitic losses, and mechanically impractical.

The organic working fluid enters a boiler 10 where it is heated by a suitable heat source to its saturation point and is completely vaporized. The heat source employed in the boiler 10 can be any one of several types, such as radioisotopes, chemical combustion, or the use of a small nuclear reactor, solar energy, gas heat, etc. It is an important characteristic of the present power conversion system that a comparatively low temperature heat source may be employed in the boiler 10. Where the power conversion system is to be applicable for use in a space environment, it will be understood that the boiler 10 will be of a type permitting its operation independently of gravitational fields so that lack of a gravitational field will have no effect on the operation of the boiler 10. From the boiler 10, the working fluid, now in its vapor phase, is directed to a power conversion device 11 which comprises a turbine coupled to an electric power generator in the form of an alternator driven by the rotating shaft 13 of the turbine which also drives a pump 14. It will be understood that the vaporized working fluid enters the inlet side of the turbine and is directed against the turbine blades to drive the turbine shaft 13, thereby operating the alternator and producing electrical energy.

From the power conversion device 11, the vaporized working fluid is exhausted through an exhaust outlet of the turbine and delivered to a condenser. In power conversion systems relying upon the Rankine cycle as heretofore contemplated, the pressure of the vaporized working fluid at the discharge outlet of the turbine has been necessarily maintained at a relatively high magnitude which limits the pressure ratio attainable across the turbine of the power conversion device 11 and thereby holds down the efficiency of the power conversion system in converting heat energy to electrical power. In accordance with the present invention, the discharge outlet of the turbine may be directly connected to a condenser of the so-called jet condenser type as will be described more fully hereinafter. However, in a preferred form of the invention, the power conversion system includes a regenerator 15 which may comprise a heat exchanger interposed between the turbine of the power conversion device 11 and the jet condenser 16 so as to receive the superheated vaporized working fluid as it is discharged from the exhaust outlet of the turbine. The vaporized working fluid passes through the heat exchanger 15 where it gives off heat to re-cycled working fluid in its liquid phase being directed through a plurality of coils in the heat exchanger 15 before returning to the boiler 10 to repeat the cycle as will be hereinafter described.

Thus, the working fluid enters the inlet end of the jet condenser 16 in a vaporized state where it is mixed with a jet stream of cooled liquid working fluid which is injected into the jet condenser 16, the cooled liquid working fluid coming from the discharge side of a heat rejection system in the form of a heat exchanger or radiator 17. The heat exchanger or radiator 17 is in direct communication with the discharge side of the jet condenser 16 so as to receive working fluid in its liquid phase as it is discharged from the jet condenser 16. The heat exchanger or radiator 17 is then effective to dissipate additional heat from the liquid working fluid such that the cooled liquid working fluid is then directed to the pump 14 from where the major portion of the cooled liquid working fluid is recycled to the boiler 10 by being directed through the coils of the regenerator 15 and subsequently passed into the boiler 10. In this latter connection, it will be understood that the superheated vaporized working fluid discharged from the discharge outlet of the turbine in passing through the regenerator 15 to the jet condenser 16 gives off heat to the re-cycled cooled liquid working fluid as the recycled cooled liquid working fluid travels through the coils of the regenreator 15 on its way to the boiler 10.

In accordance with the present invention, a portion of the cooled liquid working fluid discharged by the heat rejection system 17 is re-cycled by the pump 14 to the jet condenser 16 in forming the cooled liquid jet stream injected into the jet condenser 16 for mixing with the vaporized working fluid exhausted from the turbine of the power conversion device 11. The effect of this mixing is to cause rapid condensation of working fluid vapors for reuse and reduction of turbine back pressures, thereby improving the efficiency and increasing the electrical output of the power conversion system. While the use of a so-called jet condenser for condensing vaporized fluids has been accorded general acceptance, typically such jet condensers have relied upon a vapor-to-liquid ratio by volume in the range of 2–1 to 10–1. The present invention contemplates a specific application of a jet condenser in a power conversion system employing a closed Rankine cycle where the vapor-to-liquid ratio by volume of the jet condenser in the power conversion system lies in the range of 1000–1 to 10,000–1. In effecting rapid condensation of working fluid vapors for reuse and a significant reduction in turbine back pressures, the jet condenser 16 as specifically contemplated herein is so constructed that the liquid jets of working fluid are aimed or focused by injector orifices to enter into the jet condenser with minimum wall impingement as the liquid jets travel through the jet condenser. Thus, the cooled liquid jet stream of working fluid in being injected into the jet condenser 16 is accelerated due to the momentum exchange with the vaporized working fluid in the mixing thereof with a minimum loss in momentum as the vaporized working fluid is expanded in traveling through the jet condenser 16.

Figure 2:
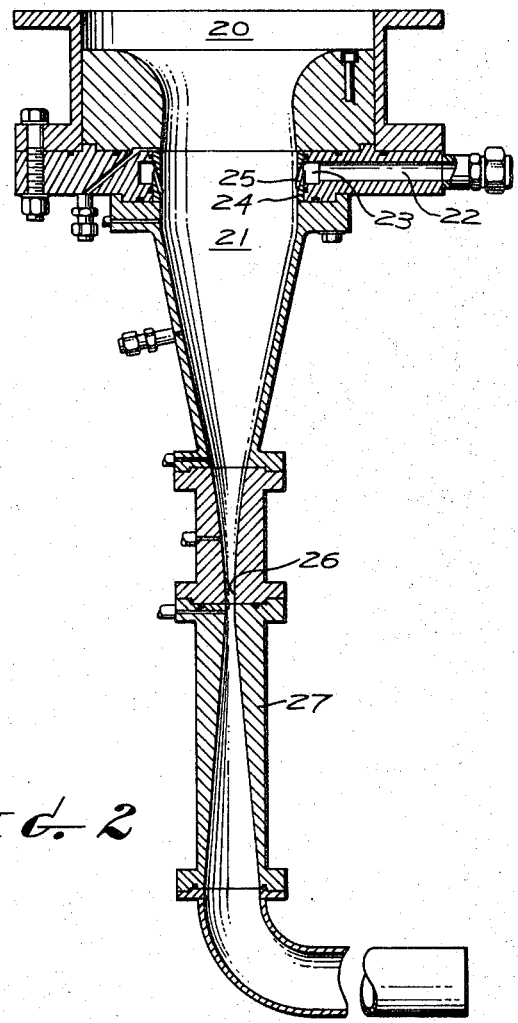
FIG. 2 is an enlarged longitudinal sectional view of a jet condenser included as a component of the power conversion system shown in FIG. 1.

Referring more specifically to FIG. 2, the structural details of the jet condenser 16 are illustrtaed. The jet condenser 16 comprises a housing having an enlarged inlet end 20 which leads into a mixing chamber 21. The housing of the jet condenser 16 is provided with a radially extending passageway 22 which serves as an inlet for the cooled liquid working fluid discharged from the heat rejection system 17 and re-cycled by the pump 14 back to the jet condenser 16. The inlet 22 communicates with an annular groove 23 at its radially inner end. The mouth of the annular groove 23 leading into the interior of the jet condenser 16 is closed by an annular orifice plate 24 having a plurality of injector orifices 25 formed therein. The injector orifices 25 provide communication between the inlet 22 and the interior of the jet condenser 16 at the entrance to the mixing chamber 21. The mixing chamber 21 is generally of frusto-conical shape, being convergent in a direction leading away from the enlarged inlet end 20 of the jet condenser 16. A convergent-divergent throat portion 26 of the jet condenser 16 is located downstream of the mixing chamber 21 at the discharge end thereof and leads directly into a divergent diffuser section 27. In accordance with the present invention, the injector orifices 25 are angularly disposed so as to aim or focus the liquid jets of working fluid injected therethrough at the convergent-divergent throat portion 26. Thus, the cooled liquid working fluid enters the jet condenser 16 as a liquid jet stream through the injector orifices 25 and travels through the jet condenser 16 with minimum wall impingement. The cooled liquid jet stream of working fluid is thereby accelerated due to the momentum exchange with the vaporized working fluid with a minimum loss in momentum.

As the cooled liquid working fluid is injected into the jet condenser 16 to mix with the vaporized working fluid entering the jet condenser 16 from the discharge outlet of the turbine, the vapor pressure of the cooled liquid working fluid will always be less than the pressure of the vaposized working fluid, and the vaporized working fluid will expand in the jet condenser 16, with the additional work done by the vaporized working fluid being converted into kinetic energy of the liquid condensate of the working fluid as the working fluid changes from a vapor phase to a liquid phase. This increase in kinetic energy can then be converted into static pressure in the diffuses section 27 of the jet condenser 16, thereby enabling a significant recovery of pressure and substantially decreasing the magnitude of power needed from the pump 14.

As previously described, the now condensed liquid working fluid is discharged from the jet condenser 16 and passes to a heat rejection system 17 from whese it is subsequently returned to the boiler 10 by the pump 14 after passing through the coils of the regenerator 15. The heat rejection system 17 may comprise a heat exchanger or radiator of a single phase type, since the jet condenser 16 is capable of substantially completely condensing all of the vaporized working fluid discharged from the turbine of the power conversion device 11 to a liquid phase prior to the introduction of the working fluid into the heat rejector system 17. Conventional power conversion systems utilizing the Rankine cycle typically include a two-phase heat exchanger therein to serve as the heat rejection component, wherein the working fluid enters such a two-phase heat exchanger in a partially vaporized state and partially liquefied state and is subsequently cooled to a wholly liquid phase.

Heretofore, a power conversion system operating within a relatively low power requirement range of the order of less than 100 kilowatts and utilizing a Rankine cycle which employed an organic working fluid had been limited in its overall efficiency to the 8–10% range. The present invention by incorporating a jet condenser in a power conversion system in the manner described potentially offers a significant increase in the efficiency of a Rankine cycle employing an organic working fluid by permitting the exhaust pressure from the turbine of the power conversion device 11 to be reduced to very low levels. In addition, the pressure recovery in the condensed liquid working fluid discharged from the jet condenser 16 eliminates gravitational problems with respect to the pump 14, thereby extending the operational life of the power conversion system. The organic working fluid permits operation of the power conversion system at lower temperatures. Where nuclear energy is employed as the heat source, the low peak temperature of the Rankine cycle (700° F.) means that nuclear heat sources, whether radioactive isotopes or nuclear reactors, are not required to operate at extreme fuel element temperatures.

Where radioactive isotopes comprise the heat source, the excellent thermal performance of the Rankine cycle employing an organic working fluid in accordance with the present invention significantly reduces by a factor of 3 to 5 the quantity of radioactive isotopic fuel required for thermo-electric power conversion. This reduction in the quantity of the fuel employed as the heat source is reflected in a significant reduction in weight of the power conversion system and a lower dollar investment in the system.

Figure 3:
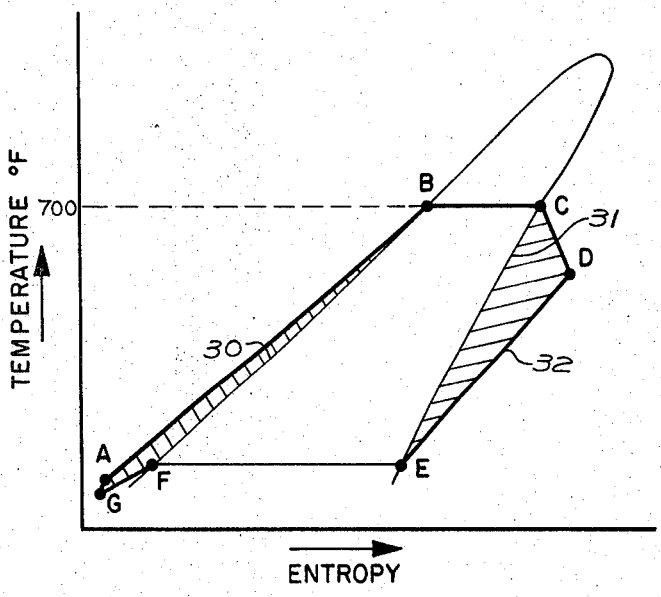
FIG. 3 is a graph showing the temperature-entropy relationship of an organic working fluid, such as a eutectic mixture of diphenyl oxide and diphenyl, as employed in the power conversion system of FIG. 1.

FIG. 3 shows a temperature-entropy graph of an organic working fluid, specifically "Dowtherm A," in its complete cycle through the power conversion system comprising the present invention. In FIG. 3, line 30 represents the saturated liquid line; line 31, the saturated vapor line; and line 32, the constant pressure line. To the left of line 30, the working fluid exists wholly in its liquid phase. To the right of line 31, the working fluid exists wholly in its vapor phase. Between lines 30 and 31, the working fluid comprises a liquid-vapor mixture. In a typical thermodynamic cycle as practiced in accordance with the present invention utilizing "Dowtherm A" as the working fluid, the peak temperature of the Rankine cycle is a comparatively low 700° F. The following description traces the thermodynamic cycle illustrated in FIG. 3 as applicable to the improved power conversion system of the present invention.

Point A is representative of the discharge pressure of pump 14 which corresponds to the inlet pressure of the boiler 10 and the jet condenser 16.

Line A–B represents heating of the liquid working fluid in the boiler 10.

Point B—working fluid in saturated liquid state in boiler 10.

Line B–C—two-phase boiling of working fluid in boiler 10.

Point C—working fluid in saturated vapor state at exit of boiler 10 and inlet to turbine of power conversion device 11.

Line C–D — expansion of vaporized working fluid through turbine.

Point D—discharge of working fluid from turbine as superheated vapor at inlet side of regenerator 15.

Line D–E—removal of superheat from vaporized working fluid by regenerator 15.

Point E—discharge of working fluid in saturated vapor state from regenerator 15 at inlet of jet condenser 16.

Line E–F—condensation of working fluid in saturated vapor state by jet condenser 16.

Point F—discharge of working fluid from jet condenser 16 as liquid at inlet side of heat rejection apparatus 17.

Line F–G—cooling of liquid working fluid by removal of heat therefrom in heat exchanger 17.

Point G—discharge of cooled liquid working fluid from heat exchanger 17 at inlet side of pump 14.

Line G–A—increase of liquid pressure in pump 14.

It will be noted that the temperature-entropy relationship of this organic working fluid provides an unusual reverse slope, which has the effect of eleminating erosion problems in the turbine of the power conversion device 11 possibly resulting from boiler carry-over or condensation of the working fluid as the vaporized working fluid is expanded in the turbine. While high pressure superheating may be employed to avoid an erosion problem where steam is employed as the working fluid in a Rankine cycle power conversion system, the use of such superheating is greatly facilitated if the power conversion system comprises individual components intended to produce electrical power in the megawatt range.

We claim:

1. In a method of producing electrical power including the steps of heating a working fluid in its liquid phase to change the working fluid to a heated vapor phase, driving a generator with the heated vaporized working fluid to produce electrical energy by expanding the heated vaporized working fluid which superheats the vaporized working fluid, removing heat from the superheated vaporized working fluid to de-superheat the vaporized working fluid, condensing the de-superheated vaporized working fluid to return the working fluid to its liquid phase, and repeating the cycle of steps, the improvement therewith of mixing cooled liquid working fluid with the de-superheated vaporized working fluid in condensing the vaporized working fluid to its liquid phase so as to fully condense the de-superheated vaporized working fluid, cooling the liquid working fluid following the condensation thereof, re-cycling a portion of the cooled liquid working fluid for mixing it with the de-sueprheated vaporized working fluid to achieve substantially complete condensation, and pre-heating the remaining portion of the cooled liquid working fluid with the heat removed from the superheated vaporized working fluid in de-superheating the vaporized working fluid prior to repeating the cycle of steps.

2. A system for producing power, comprising:
a boiler for converting a fluid from liquid to gas;
an engine driven by the gas from said boiler for producing power and for exhausting superheated gas;
a regenerator for cooling the superheated gas from said engine;
a direct gas to liquid contact condenser for converting the gas from said regenerator to liquid;
a heat exchanger for cooling the liquid from said condenser; and
means to convey the liquid from said heat exchanger to said boiler through said regenerator, and
additional means to convey a part of the liquid from said heat exchanger to said condenser to aid in converting the gas to liquid.

3. The system of claim 2 wherein said regenerator includes
a liquid conduit and
a gas conduit,
said conduits arranged such that the superheated gas heats the liquid flowing from said heat exchanger to said boiler and the liquid cools the superheated gas flowing from said engine to said condenser.

4. The system of claim 2 wherein connections between said boiler, engine, regenerator, condenser, heat exchanger and means to convey provide a closed system.

5. The system of claim 2 wherein said means to convey comprises
a pump connected to receive liquid from said heat exchanger and discharge liquid to said regenerator.

6. The system of claim 5 wherein said pump is driven by said engine.

7. The system of claim 6 wherein said additional means to convey is dimensioned to provide a volume ratio of 1000:1 to 10,000:1 between vapor and liquid entering said condenser.

8. The system of claim 7 wherein said condenser is of the jet type.

9. A system of producing power as set forth in claim 2, wherein the fluid is organic.

10. A system of producing power as set forth in claim 9, wherein the organic fluid comprises a mixture of 26.5% diphenyl and 73.5% diphenyl oxide by weight.

References Cited

UNITED STATES PATENTS

| | | | |
|---|---|---|---|
| 2,120,909 | 6/1938 | Schmer | 60—95 |
| 2,303,159 | 11/1942 | Cross et al. | 60—95 |
| 2,714,289 | '8/1955 | Hofmann | 60—92X |
| 2,939,286 | 6/1960 | Pavlecka | 60—92X |
| 1,803,054 | 4/1931 | Broido | 60—94 |
| 2,278,085 | 3/1942 | Ostermann | 60—94 |
| 2,424,654 | 7/1947 | Gamble | 48—180 |
| 3,336,013 | 8/1967 | Salo | 60—94X |
| 3,423,078 | 1/1969 | May | 60—94X |

OTHER REFERENCES

Handbook of Material Trade Names, Zimmerman and Lavine, Industrial Research Service, 1946 ed., page 141.

CARROLL B. DORITY, JR., Primary Examiner

U.S. Cl. X.R.

60—95